(12) United States Patent
Sato

(10) Patent No.: US 7,817,348 B2
(45) Date of Patent: Oct. 19, 2010

(54) ZOOM LENS AND IMAGING APPARATUS

(75) Inventor: Kenichi Sato, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 57 days.

(21) Appl. No.: 12/413,031

(22) Filed: Mar. 27, 2009

(65) Prior Publication Data

US 2009/0268307 A1   Oct. 29, 2009

(30) Foreign Application Priority Data

Apr. 24, 2008   (JP) .................... P2008-113936

(51) Int. Cl.
  G02B 15/14   (2006.01)
  G02B 17/00   (2006.01)
(52) U.S. Cl. ..................... 359/687; 359/726
(58) Field of Classification Search .............. 359/687, 359/726
See application file for complete search history.

(56) References Cited

U.S. PATENT DOCUMENTS

| 7,242,529 B2 * | 7/2007 | Sato et al. .......... 359/676 |
| 2003/0161620 A1 | 8/2003 | Hagimori et al. |
| 2004/0233302 A1 | 11/2004 | Kojima |
| 2006/0215277 A1 | 9/2006 | Sato |

FOREIGN PATENT DOCUMENTS

| EP | 1 881 357 A1 | 1/2008 |
| JP | 2000-131610 A | 5/2000 |
| JP | 2003-202500 A | 7/2003 |
| WO | WO-2007/032509 A1 | 3/2007 |

OTHER PUBLICATIONS

Chinese Office Action issued May 4, 2010 (with English translation) in corresponding Chinese Application No. 200910130147.1.

* cited by examiner

*Primary Examiner*—William C Choi
(74) *Attorney, Agent, or Firm*—Birch, Stewart, Kolasch & Birch, LLP

(57) ABSTRACT

A zoom lens is provided and includes: in order from an object side of the zoom lens, a first lens group adapted to be fixed during power-varying of the zoom lens, the first lens group having a positive power and including in order from the object side, a negative lens, a reflecting member that bends an optical path thereof, and a biconvex lens of a positive lens made of a resin material and having at least one aspherical surface; a second lens group adapted to move during the power-varying, the second lens group having a negative power and including two lenses; a third lens group adapted to be fixed during the power-varying and including one positive lens; and a fourth lens group adapted to move during the power-varying and during focusing of the zoom lens, the fourth lens having a positive power and including in order from the object side, a cemented lens having a positive power, and a negative lens made of a resin material and having at least one aspherical surface and a concave surface on an image side of the fourth lens.

18 Claims, 23 Drawing Sheets

EXAMPLE 1
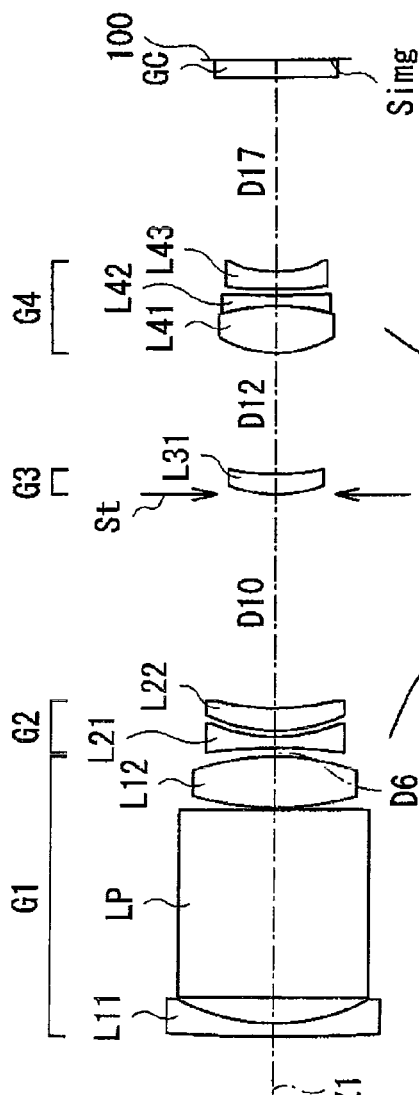
FIG. 1A   WIDE ANGLE END
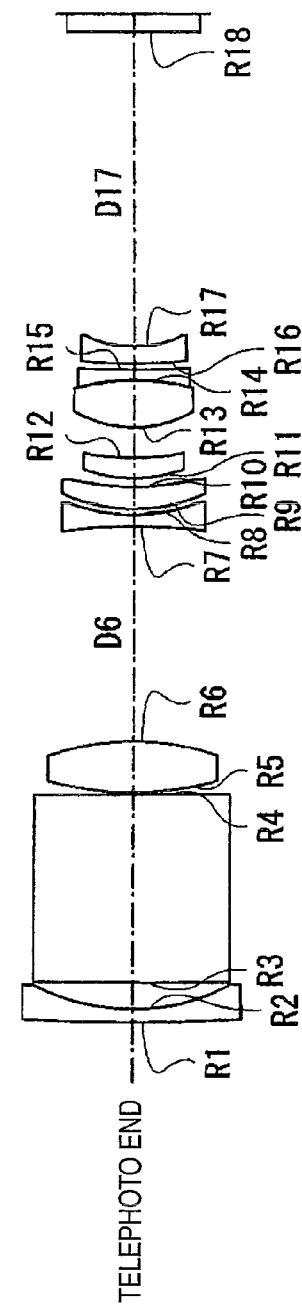
FIG. 1B   TELEPHOTO END

EXAMPLE 2
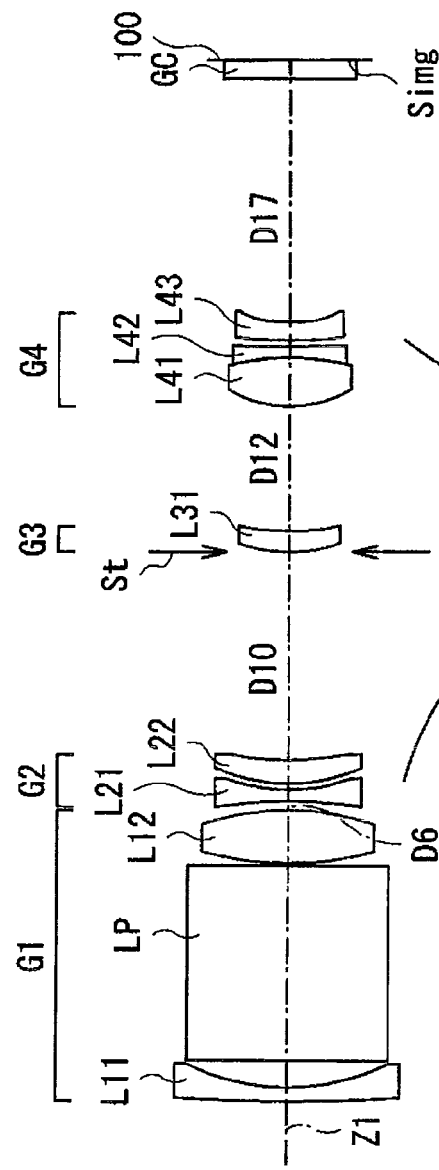
FIG. 2A  WIDE ANGLE END
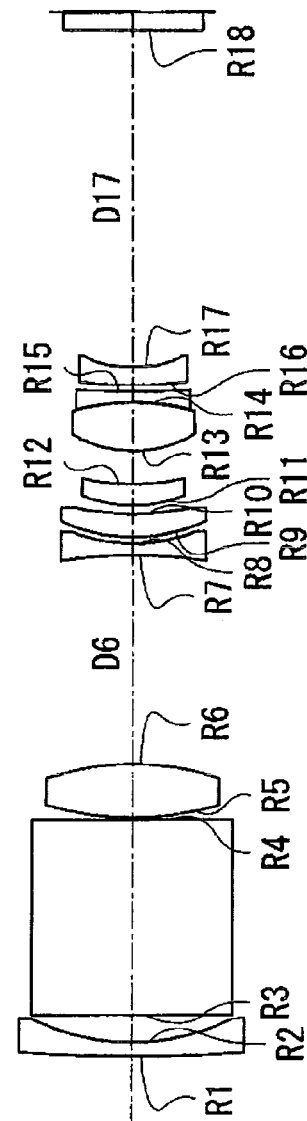
FIG. 2B  TELEPHOTO END

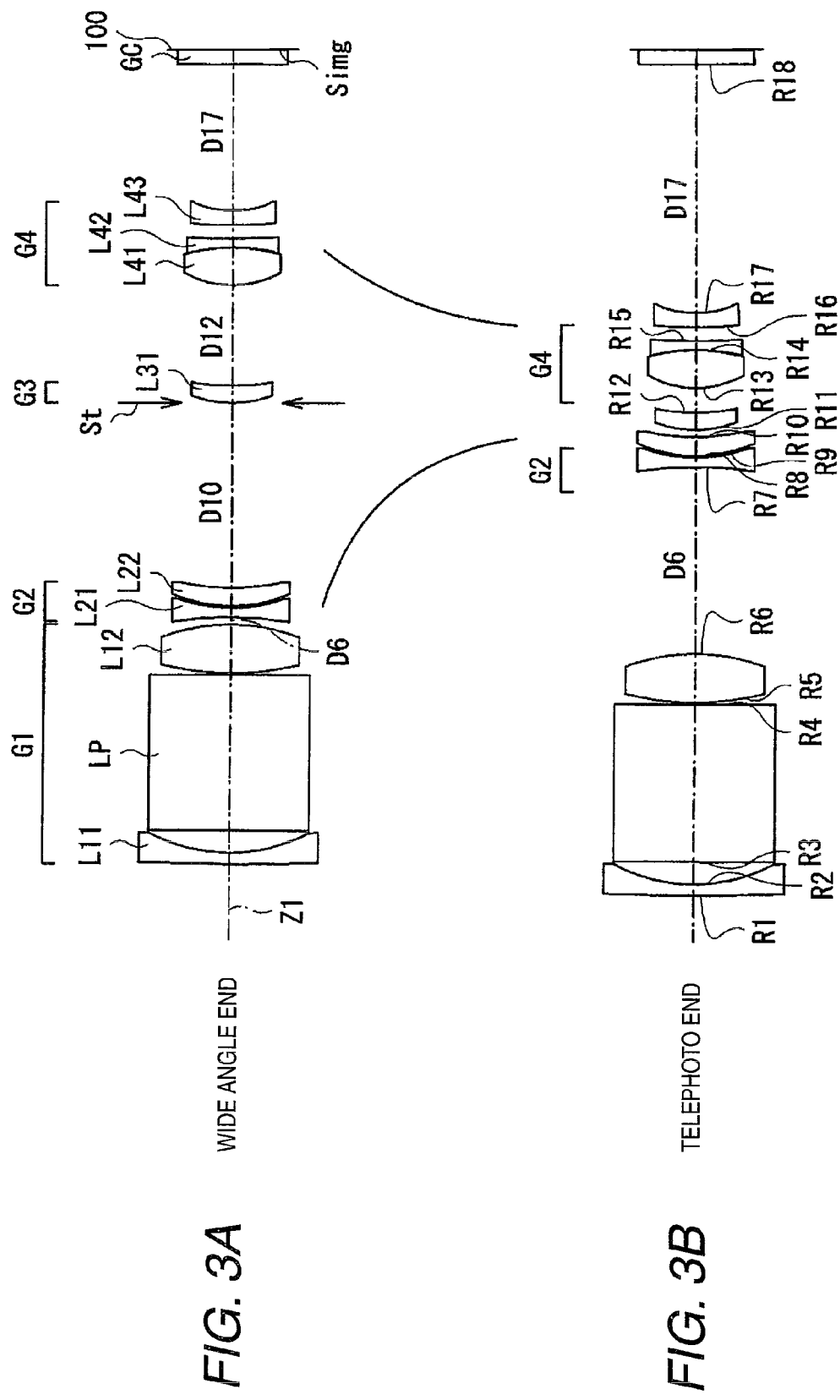

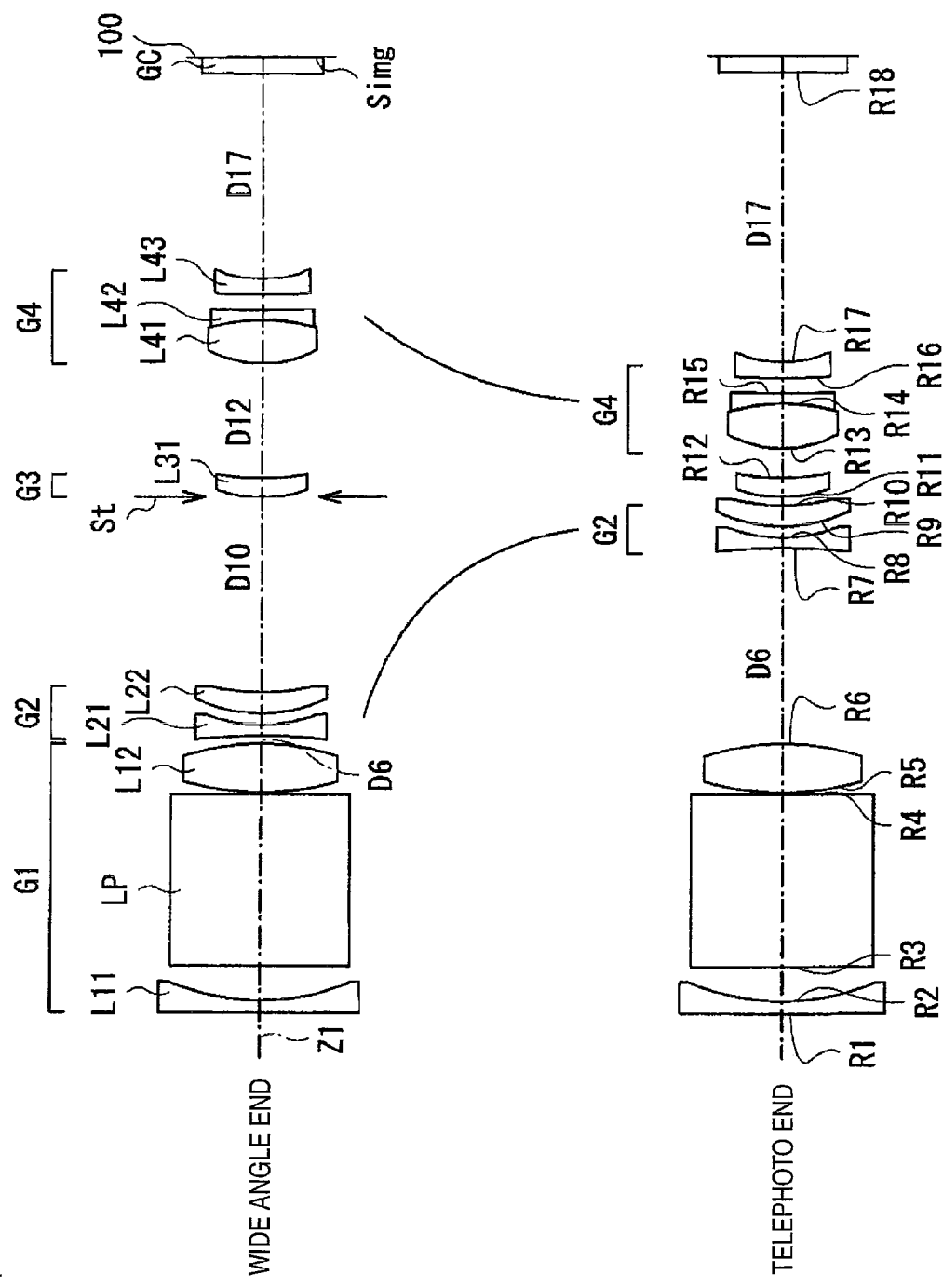
FIG. 4A WIDE ANGLE END
FIG. 4B TELEPHOTO END
EXAMPLE 4

FIG. 6A

| EXAMPLE 1 : BASIC LENS DATA | | | | |
|---|---|---|---|---|
| Si | Ri | Di | Ndj | νdj |
| 1 | 99.5221 | 0.650 | 1.90366 | 31.3 |
| 2 | 9.8066 | 1.300 | | |
| 3 | ∞ | 9.200 | 1.78590 | 44.2 |
| 4 | ∞ | 0.100 | | |
| *5 | 13.6017 | 2.500 | 1.51007 | 56.2 |
| *6 | -12.0799 | D6 ( VA ) | | |
| 7 | -24.7829 | 0.550 | 1.78800 | 47.4 |
| 8 | 7.9930 | 0.300 | | |
| 9 | 7.9330 | 1.100 | 1.92286 | 18.9 |
| 10 | 12.3606 | D10 ( VA ) | | |
| *11 ( AD ) | 7.2216 | 1.000 | 1.51007 | 56.2 |
| *12 | 15.0134 | D12 ( VA ) | | |
| 13 | 5.4720 | 2.310 | 1.72916 | 54.7 |
| 14 | -10.3367 | 0.520 | 1.90366 | 31.3 |
| 15 | 64.5017 | 0.300 | | |
| *16 | 240.3705 | 0.850 | 1.60595 | 27.0 |
| *17 | 8.2726 | D17 ( VA ) | | |
| 18 | ∞ | 0.850 | 1.51680 | 64.2 |
| IMG | ∞ | 0.000 | | |

G1: surfaces 1–6
G2: surfaces 7–10
G3: surfaces 11–12
G4: surfaces 13–17
GC: surfaces 18–IMG ( f=6.6~18.6mm, FNO.=3.7~4.8, 2ω=61.4° ~21.7° )

Si : SURFACE NUMBER
Ri : RADIUS OF CURVATURE
Di : SURFACE SPACING
Ndj : REFRACTIVE INDEX
νdj : ABBE NUMBER
* : ASPHERICAL SURFACE
VA : VARIABLE
AD : APERTURE DIAPHRAGM

FIG. 6B

| EXAMPLE 1 : SURFACE SPACING DATA OF VARIABLE SURFACE DATA | | | | |
|---|---|---|---|---|
| | D6 | D10 | D12 | D17 |
| WE | 0.42 | 10.54 | 5.91 | 10.93 |
| TE | 10.55 | 0.42 | 1.47 | 15.35 |

WE : WIDE ANGLE END
TE : TELEPHOTO END

FIG. 7

| EXAMPLE 1 : ASPHERICAL DATA |||||||
|---|---|---|---|---|---|---|
| SN | COEFFICIENT ||||||
| 5 | KA | A3 | A4 | A5 | A6 ||
|  | 9.8554030E-01 | -1.2759488E-03 | 3.9272227E-04 | -1.6254562E-05 | -2.2705145E-05 ||
|  | A7 | A8 | A9 | A10 |  ||
|  | 1.4720237E-06 | 5.4733778E-07 | 7.4323015E-09 | -1.4101775E-08 |  ||
| 6 | KA | A3 | A4 | A5 | A6 ||
|  | 5.4687500E-01 | -1.5444254E-03 | 9.8029070E-04 | -2.9544678E-04 | 3.8061044E-05 ||
|  | A7 | A8 | A9 | A10 |  ||
|  | 1.1819877E-06 | -5.8861402E-07 | -4.4012044E-08 | 1.0030704E-08 |  ||
| 11 | KA | A3 | A4 | A5 | A6 ||
|  | 4.1159144E+00 | 3.0129579E-04 | -4.1609973E-04 | 6.0429035E-05 | -1.0681952E-05 ||
|  | A7 | A8 | A9 | A10 |  ||
|  | -4.2920583E-06 | 1.8484821E-06 | -2.3955279E-08 | -1.2783830E-07 |  ||
| 12 | KA | A3 | A4 | A5 | A6 ||
|  | 1.2759763E+00 | -1.8011482E-04 | 1.8169457E-03 | -5.2505445E-04 | 1.6982830E-04 ||
|  | A7 | A8 | A9 | A10 |  ||
|  | 1.4637235E-05 | -1.0210204E-06 | 3.5946748E-08 | 1.1072574E-07 |  ||
| 16 | KA | A3 | A4 | A5 | A6 ||
|  | 5.5830830E-01 | 2.8061221E-04 | 5.0125225E-03 | -4.4158983E-04 | -1.0053043E-04 ||
|  | A7 | A8 | A9 | A10 | A11 ||
|  | -4.6830584E-06 | -7.0505500E-08 | 9.9419267E-09 | 1.1891216E-09 | 7.2751970E-11 ||
|  | A12 |  |  |  |  ||
|  | 5.4378741E-12 |  |  |  |  ||
| 17 | KA | A3 | A4 | A5 | A6 ||
|  | 3.9568256E+00 | 8.3557806E-04 | 6.5650310E-03 | -8.8274003E-05 | -6.9415721E-06 ||
|  | A7 | A8 | A9 | A10 | A11 ||
|  | -1.2951811E-06 | -1.8511085E-07 | -1.4707507E-08 | -1.0278994E-09 | 9.6098932E-13 ||
|  | A12 |  |  |  |  ||
|  | 1.1772317E-12 |  |  |  |  ||

SN : SURFACE NUMBER

FIG. 8A

| | EXAMPLE 2 : BASIC LENS DATA | | | | |
|---|---|---|---|---|---|
| | Si | Ri | Di | Ndj | νdj |
| G1 | 1 | 73.8464 | 0.650 | 1.90366 | 31.3 |
| | 2 | 10.1274 | 1.300 | | |
| | 3 | ∞ | 9.200 | 1.78590 | 44.2 |
| | 4 | ∞ | 0.100 | | |
| | *5 | 13.4610 | 2.500 | 1.51007 | 56.2 |
| | *6 | -12.4151 | D6(VA) | | |
| G2 | 7 | -22.3002 | 0.550 | 1.78800 | 47.4 |
| | 8 | 7.9427 | 0.300 | | |
| | 9 | 7.8626 | 1.100 | 1.92286 | 18.9 |
| | 10 | 12.3164 | D10(VA) | | |
| G3 | *11(AD) | 7.2496 | 1.000 | 1.51007 | 56.2 |
| | *12 | 13.1679 | D12(VA) | | |
| G4 | 13 | 5.4566 | 2.310 | 1.72916 | 54.7 |
| | 14 | -10.2768 | 0.520 | 1.90366 | 31.3 |
| | 15 | 75.9730 | 0.300 | | |
| | *16 | 137.5954 | 0.850 | 1.60595 | 27.0 |
| | *17 | 8.6754 | D17(VA) | | |
| GC | 18 | ∞ | 0.850 | 1.51680 | 64.2 |
| | IMG | ∞ | 0.000 | | |

(f=6.8~19.3mm, FNO.=3.7~4.8, 2ω=59.7°~21.0°)

Si : SURFACE NUMBER   νdj : ABBE NUMBER
Ri : RADIUS OF CURVATURE   * : ASPHERICAL SURFACE
Di : SURFACE SPACING   VA : VARIABLE
Ndj : REFRACTIVE INDEX   AD : APERTURE DIAPHRAGM

FIG. 8B

| EXAMPLE 2 : SURFACE SPACING DATA OF VARIABLE SURFACE DATA | | | | |
|---|---|---|---|---|
| | D6 | D10 | D12 | D17 |
| WE | 0.42 | 9.91 | 5.91 | 11.49 |
| TE | 9.91 | 0.42 | 1.55 | 15.83 |

WE : WIDE ANGLE END
TE : TELEPHOTO END

FIG. 9

| EXAMPLE 2 : ASPHERICAL DATA ||||||
|---|---|---|---|---|---|
| SN | COEFFICIENT |||||
| 5 | KA | A3 | A4 | A5 | A6 |
| | 9.8446620E-01 | -1.2329809E-03 | 3.8483096E-04 | -1.6379630E-05 | -2.2700896E-05 |
| | A7 | A8 | A9 | A10 | |
| | 1.4679586E-06 | 5.4618621E-07 | 7.3276291E-09 | -1.4110425E-08 | |
| 6 | KA | A3 | A4 | A5 | A6 |
| | 5.4715450E-01 | -1.5077411E-03 | 9.7801765E-04 | -2.9647320E-04 | 3.8022401E-05 |
| | A7 | A8 | A9 | A10 | |
| | 1.1871521E-06 | -5.8754130E-07 | -4.3909016E-08 | 1.0040782E-08 | |
| 11 | KA | A3 | A4 | A5 | A6 |
| | 4.1345816E+00 | 3.6173198E-04 | -4.1080072E-04 | 6.0736067E-05 | -1.0666829E-05 |
| | A7 | A8 | A9 | A10 | |
| | -4.2914394E-06 | 1.8485183E-06 | -2.3952928E-08 | -1.2783822E-07 | |
| 12 | KA | A3 | A4 | A5 | A6 |
| | 1.2754536E+00 | -1.0713978E-04 | 1.8119281E-03 | -5.2535242E-04 | 1.6981677E-04 |
| | A7 | A8 | A9 | A10 | |
| | 1.4637015E-05 | -1.0210225E-06 | 3.5946519E-08 | 1.1072582E-07 | |
| 16 | KA | A3 | A4 | A5 | A6 |
| | 5.5830770E-01 | 1.5078538E-04 | 4.9981787E-03 | -4.4263397E-04 | -1.0061142E-04 |
| | A7 | A8 | A9 | A10 | A11 |
| | -4.6873448E-06 | -7.0749007E-08 | 9.9327567E-09 | 1.1889210E-09 | 7.2730073E-11 |
| | A12 | | | | |
| | 5.4371324E-12 | | | | |
| 17 | KA | A3 | A4 | A5 | A6 |
| | 3.9596620E+00 | 7.1189981E-04 | 6.5618350E-03 | -8.8186842E-05 | -6.9265355E-06 |
| | A7 | A8 | A9 | A10 | A11 |
| | -1.2941539E-06 | -1.8504276E-07 | -1.4703793E-08 | -1.0275297E-09 | 9.7380331E-13 |
| | A12 | | | | |
| | 1.1772009E-12 | | | | |

SN : SURFACE NUMBER

FIG. 10A

| | EXAMPLE 3 : BASIC LENS DATA | | | | |
|---|---|---|---|---|---|
| | Si | Ri | Di | Ndj | νdj |
| G1 | 1 | 140.9130 | 0.650 | 1.90366 | 31.3 |
| | 2 | 9.6399 | 1.300 | | |
| | 3 | ∞ | 9.200 | 1.78590 | 44.2 |
| | 4 | ∞ | 0.100 | | |
| | *5 | 14.7384 | 2.850 | 1.51007 | 56.2 |
| | *6 | -11.2269 | D6 ( VA ) | | |
| G2 | 7 | -21.0704 | 0.550 | 1.78800 | 47.4 |
| | 8 | 8.8171 | 0.100 | | |
| | 9 | 8.4142 | 1.100 | 1.92286 | 18.9 |
| | 10 | 13.6174 | D10 ( VA ) | | |
| G3 | *11 ( AD ) | 7.2069 | 1.000 | 1.51007 | 56.2 |
| | *12 | 16.4543 | D12 ( VA ) | | |
| G4 | 13 | 5.6924 | 2.210 | 1.72916 | 54.7 |
| | 14 | -10.1108 | 0.520 | 1.90366 | 31.3 |
| | 15 | 58.8475 | 0.800 | | |
| | *16 | -3188.84 | 0.850 | 1.60595 | 27.0 |
| | *17 | 8.9450 | D17 ( VA ) | | |
| GC | 18 | ∞ | 0.850 | 1.51680 | 64.2 |
| | IMG | ∞ | 0.000 | | |

(f=6.4~18.1mm, FNO.=3.7~4.7, 2ω=62.9° ~22.1° )

Si : SURFACE NUMBER
Ri : RADIUS OF CURVATURE
Di : SURFACE SPACING
Ndj : REFRACTIVE INDEX
νdj : ABBE NUMBER
* : ASPHERICAL SURFACE
VA : VARIABLE
AD : APERTURE DIAPHRAGM

FIG. 10B

| EXAMPLE 3 : SURFACE SPACING DATA OF VARIABLE SURFACE DATA | | | | |
|---|---|---|---|---|
| | D6 | D10 | D12 | D17 |
| WE | 0.42 | 10.89 | 5.91 | 9.98 |
| TE | 10.90 | 0.42 | 1.43 | 14.46 |

WE : WIDE ANGLE END
TE : TELEPHOTO END

FIG. 11

| SN | COEFFICIENT | | | | |
|---|---|---|---|---|---|
| 5 | KA | A3 | A4 | A5 | A6 |
|  | 9.8427810E-01 | -1.2329976E-03 | 3.7389777E-04 | -1.4113070E-05 | -2.2752988E-05 |
|  | A7 | A8 | A9 | A10 |  |
|  | 1.4521023E-06 | 5.4599030E-07 | 7.5061951E-09 | -1.4071817E-08 |  |
| 6 | KA | A3 | A4 | A5 | A6 |
|  | 5.4621460E-01 | -1.5286195E-03 | 9.6963127E-04 | -2.9655414E-04 | 3.8173100E-05 |
|  | A7 | A8 | A9 | A10 |  |
|  | 1.1955924E-06 | -5.8875619E-07 | -4.4218709E-08 | 9.9927901E-09 |  |
| 11 | KA | A3 | A4 | A5 | A6 |
|  | 4.1109608E+00 | 2.5171435E-04 | -4.3555486E-04 | 5.9868929E-05 | -1.0719199E-05 |
|  | A7 | A8 | A9 | A10 |  |
|  | -4.2937731E-06 | 1.8484235E-06 | -2.3952624E-08 | -1.2783767E-07 |  |
| 12 | KA | A3 | A4 | A5 | A6 |
|  | 1.2736643E+00 | -1.9193737E-04 | 1.7870217E-03 | -5.2569155E-04 | 1.6987673E-04 |
|  | A7 | A8 | A9 | A10 |  |
|  | 1.4642393E-05 | -1.0206522E-06 | 3.5967413E-08 | 1.1072656E-07 |  |
| 16 | KA | A3 | A4 | A5 | A6 |
|  | 5.5830820E-01 | 2.4035798E-04 | 5.0002746E-03 | -4.4068723E-04 | -1.0040664E-04 |
|  | A7 | A8 | A9 | A10 | A11 |
|  | -4.6750393E-06 | -6.9945465E-08 | 9.9727581E-09 | 1.1922486E-09 | 7.2909248E-11 |
|  | A12 |  |  |  |  |
|  | 5.4398747E-12 |  |  |  |  |
| 17 | KA | A3 | A4 | A5 | A6 |
|  | 3.9535877E+00 | 8.8772218E-04 | 6.5868866E-03 | -8.8215353E-05 | -6.9881625E-06 |
|  | A7 | A8 | A9 | A10 | A11 |
|  | -1.2986595E-06 | -1.8533077E-07 | -1.4719883E-08 | -1.0280658E-09 | 1.1198439E-12 |
|  | A12 |  |  |  |  |
|  | 1.1754372E-12 |  |  |  |  |

EXAMPLE 3 : ASPHERICAL DATA

SN : SURFACE NUMBER

FIG. 12A

| | EXAMPLE 4 : BASIC LENS DATA ||||
|---|---|---|---|---|
| Si | Ri | Di | Ndj | νdj |
| G1 {  1 | 854.0577 | 0.650 | 1.90366 | 31.3 |
| 2 | 11.7890 | 1.800 | | |
| 3 | ∞ | 9.000 | 1.78590 | 44.2 |
| 4 | ∞ | 0.100 | | |
| *5 | 13.3377 | 2.500 | 1.51007 | 56.2 |
| *6 | -13.2120 | D6 ( VA ) | | |
| G2 {  7 | -32.4934 | 0.550 | 1.78800 | 47.4 |
| 8 | 7.5441 | 0.600 | | |
| 9 | 7.7246 | 1.100 | 1.92286 | 18.9 |
| 10 | 11.0661 | D10 ( VA ) | | |
| G3 {  *11 ( AD ) | 7.3809 | 1.000 | 1.51007 | 56.2 |
| *12 | 15.5354 | D12 ( VA ) | | |
| G4 {  13 | 5.7352 | 2.310 | 1.72916 | 54.7 |
| 14 | -9.7998 | 0.520 | 1.90366 | 31.3 |
| 15 | 79.2534 | 0.800 | | |
| *16 | -82.2948 | 0.850 | 1.60595 | 27.0 |
| *17 | 10.1892 | D17 ( VA ) | | |
| GC {  18 | ∞ | 0.850 | 1.51680 | 64.2 |
| IMG | ∞ | 0.000 | | |

( f=6.8∼19.1mm, FNO.=3.8∼4.9, 2ω=59.8°∼21.0° )

Si : SURFACE NUMBER  
Ri : RADIUS OF CURVATURE  
Di : SURFACE SPACING  
Ndj : REFRACTIVE INDEX  
νdj : ABBE NUMBER  
* : ASPHERICAL SURFACE  
VA : VARIABLE  
AD : APERTURE DIAPHRAGM

FIG. 12B

| | EXAMPLE 4 : SURFACE SPACING DATA OF VARIABLE SURFACE DATA ||||
|---|---|---|---|---|
| | D6 | D10 | D12 | D17 |
| WE | 0.42 | 10.29 | 5.91 | 13.30 |
| TE | 10.29 | 0.42 | 1.50 | 17.71 |

WE : WIDE ANGLE END  
TE : TELEPHOTO END

FIG. 13

| EXAMPLE 4 : ASPHERICAL DATA |||||||
|---|---|---|---|---|---|---|
| SN | COEFFICIENT ||||||
| 5 | KA | A3 | A4 | A5 | A6 ||
| | 9.8448240E-01 | -1.4277012E-03 | 3.8995614E-04 | -1.3651288E-05 | -2.2704123E-05 ||
| | A7 | A8 | A9 | A10 | ||
| | 1.3951740E-06 | 5.3975232E-07 | 7.4075412E-09 | -1.4015014E-08 | ||
| 6 | KA | A3 | A4 | A5 | A6 ||
| | 5.3658860E-01 | -1.7743770E-03 | 1.0248291E-03 | -2.9851989E-04 | 3.8141882E-05 ||
| | A7 | A8 | A9 | A10 | ||
| | 1.2000810E-06 | -5.9200304E-07 | -4.5023982E-08 | 9.8574159E-09 | ||
| 11 | KA | A3 | A4 | A5 | A6 ||
| | 4.3194081E+00 | 3.4636477E-04 | -4.4375142E-04 | 6.3467089E-05 | -1.0495429E-05 ||
| | A7 | A8 | A9 | A10 | ||
| | -4.2848753E-06 | 1.8488352E-06 | -2.3949650E-08 | -1.2783369E-07 | ||
| 12 | KA | A3 | A4 | A5 | A6 ||
| | 1.2691174E+00 | -9.6773204E-05 | 1.7311703E-03 | -5.2676793E-04 | 1.7008248E-04 ||
| | A7 | A8 | A9 | A10 | ||
| | 1.4662639E-05 | -1.0191939E-06 | 3.6028611E-08 | 1.1073566E-07 | ||
| 16 | KA | A3 | A4 | A5 | A6 ||
| | 5.5830210E-01 | 1.1789472E-04 | 5.0287144E-03 | -4.3652612E-04 | -1.0009005E-04 ||
| | A7 | A8 | A9 | A10 | A11 ||
| | -4.6545358E-06 | -6.8255887E-08 | 1.0077542E-08 | 1.2017490E-09 | 7.1888805E-11 ||
| | A12 | | | | ||
| | 5.4902190E-12 | | | | ||
| 17 | KA | A3 | A4 | A5 | A6 ||
| | 3.9171079E+00 | 8.8848964E-04 | 6.5690126E-03 | -9.0435353E-05 | -7.1162468E-06 ||
| | A7 | A8 | A9 | A10 | A11 ||
| | -1.3038979E-06 | -1.8562342E-07 | -1.4738729E-08 | -1.0266560E-09 | -3.6515933E-14 ||
| | A12 | | | | ||
| | 3.8844915E-13 | | | | ||

SN : SURFACE NUMBER

FIG. 14A

| | EXAMPLE 5 : BASIC LENS DATA | | | | |
|---|---|---|---|---|---|
| | Si | Ri | Di | Ndj | νdj |
| G1 | 1 | 241.6528 | 0.650 | 1.90366 | 31.3 |
| | 2 | 9.0926 | 1.500 | | |
| | 3 | ∞ | 9.200 | 1.78590 | 44.2 |
| | 4 | ∞ | 0.100 | | |
| | *5 | 13.6675 | 2.500 | 1.51007 | 56.2 |
| | *6 | -11.9742 | D6(VA) | | |
| G2 | 7 | -103.077 | 0.900 | 1.88300 | 40.8 |
| | 8 | 7.0185 | 0.500 | | |
| | 9 | 7.4303 | 1.200 | 1.92286 | 18.9 |
| | 10 | 12.5819 | D10(VA) | | |
| G3 | *11(AD) | 7.3235 | 1.000 | 1.51007 | 56.2 |
| | *12 | 20.1693 | D12(VA) | | |
| G4 | 13 | 5.5577 | 2.310 | 1.72916 | 54.7 |
| | 14 | -9.3305 | 0.520 | 1.90366 | 31.3 |
| | 15 | 56.6161 | 0.100 | | |
| | *16 | -171.511 | 0.850 | 1.60595 | 27.0 |
| | *17 | 8.4170 | D17(VA) | | |
| GC | 18 | ∞ | 0.850 | 1.51680 | 64.2 |
| | IMG | ∞ | 0.000 | | |

(f=6.0~16.9mm, FNO.=3.7~4.8, 2ω=66.3°~23.8°)

Si : SURFACE NUMBER  νdj : ABBE NUMBER
Ri : RADIUS OF CURVATURE  * : ASPHERICAL SURFACE
Di : SURFACE SPACING  VA : VARIABLE
Ndj : REFRACTIVE INDEX  AD : APERTURE DIAPHRAGM

FIG. 14B

| EXAMPLE 5 : SURFACE SPACING DATA OF VARIABLE SURFACE DATA | | | | |
|---|---|---|---|---|
| | D6 | D10 | D12 | D17 |
| WE | 0.42 | 12.04 | 6.31 | 12.93 |
| TE | 12.04 | 0.42 | 1.38 | 17.86 |

WE : WIDE ANGLE END
TE : TELEPHOTO END

FIG. 15

| EXAMPLE 5 : ASPHERICAL DATA |||||||
|---|---|---|---|---|---|
| SN | COEFFICIENT |||||
| 5 | KA | A3 | A4 | A5 | A6 |
| | 9.8627420E-01 | -1.5150547E-03 | 4.0850770E-04 | -1.6584365E-05 | -2.2956514E-05 |
| | A7 | A8 | A9 | A10 | |
| | 1.4257255E-06 | 5.4485569E-07 | 7.7251366E-09 | -1.4004185E-08 | |
| 6 | KA | A3 | A4 | A5 | A6 |
| | 5.4368840E-01 | -1.7951486E-03 | 9.8481444E-04 | -2.9578714E-04 | 3.8130275E-05 |
| | A7 | A8 | A9 | A10 | |
| | 1.1786031E-06 | -5.9338929E-07 | -4.4935344E-08 | 9.8927256E-09 | |
| 11 | KA | A3 | A4 | A5 | A6 |
| | 4.2424327E+00 | 2.4667755E-04 | -4.8998927E-04 | 6.5849666E-05 | -1.0213658E-05 |
| | A7 | A8 | A9 | A10 | |
| | -4.2733277E-06 | 1.8492661E-06 | -2.3917934E-08 | -1.2783654E-07 | |
| 12 | KA | A3 | A4 | A5 | A6 |
| | 1.2701808E+00 | -1.9053717E-04 | 1.7068011E-03 | -5.3312538E-04 | 1.6950405E-04 |
| | A7 | A8 | A9 | A10 | |
| | 1.4634713E-05 | -1.0204310E-06 | 3.5999487E-08 | 1.1073110E-07 | |
| 16 | KA | A3 | A4 | A5 | A6 |
| | 5.5822490E-01 | 1.4459696E-03 | 5.1463036E-03 | -4.3127516E-04 | -9.9622452E-05 |
| | A7 | A8 | A9 | A10 | A11 |
| | -4.6209828E-06 | -6.5713820E-08 | 1.0235214E-08 | 1.2120605E-09 | 7.5218667E-11 |
| | A12 | | | | |
| | 5.4298371E-12 | | | | |
| 17 | KA | A3 | A4 | A5 | A6 |
| | 3.9494832E+00 | 2.1528255E-03 | 6.6113473E-03 | -8.6589154E-05 | -6.8721254E-06 |
| | A7 | A8 | A9 | A10 | A11 |
| | -1.2956204E-06 | -1.8543160E-07 | -1.4724296E-08 | -1.0267775E-09 | 1.6366575E-12 |
| | A12 | | | | |
| | 1.2143337E-12 | | | | |

SN : SURFACE NUMBER

FIG. 16

| VALUE OF CONDITIONAL EXPRESSION | | | | | | |
|---|---|---|---|---|---|---|
| CE | EN | EXAMPLE 1 | EXAMPLE 2 | EXAMPLE 3 | EXAMPLE 4 | EXAMPLE 5 |
| $-1.0 < f2/fw < -3.0$ | (1) | $-1.73$ | $-1.61$ | $-1.83$ | $-1.64$ | $-2.08$ |
| $2.0 < f4/fw < 5.0$ | (2) | 2.58 | 2.26 | 2.81 | 2.53 | 3.49 |
| RN | (3) | 7.9930 | 7.9427 | 8.8171 | 7.5441 | 7.0185 |
| RP | (3) | 7.9330 | 7.8626 | 8.4142 | 7.7246 | 7.4303 |
| $|RP|/|RN| < 1.1$ | (3) | 1.0000 | 0.9899 | 0.9543 | 1.0239 | 1.0587 |
| $-10.0 < P4/fw < 0$ | (4) | $-2.16$ | $-2.25$ | $-2.31$ | $-2.21$ | $-2.21$ |

CE : CONDITIONAL EXPRESSION
EN : EXPRESSION NUMBER

FIG. 17A  FIG. 17B  FIG. 17C
EXAMPLE 1 : WIDE ANGLE END
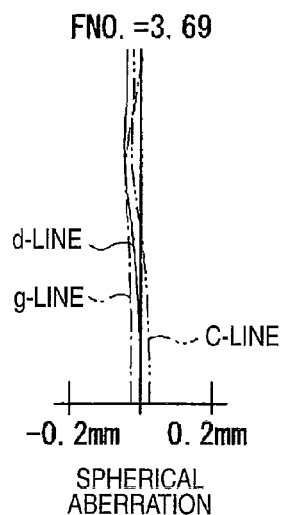
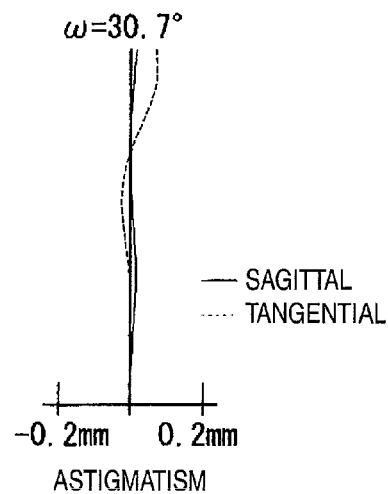
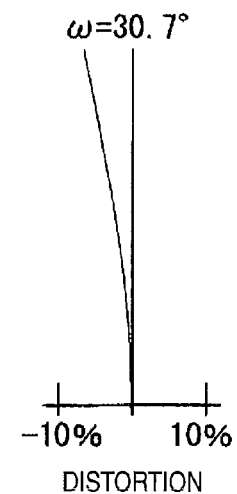
FIG. 18A  FIG. 18B  FIG. 18C
EXAMPLE 1 : TELEPHOTO END
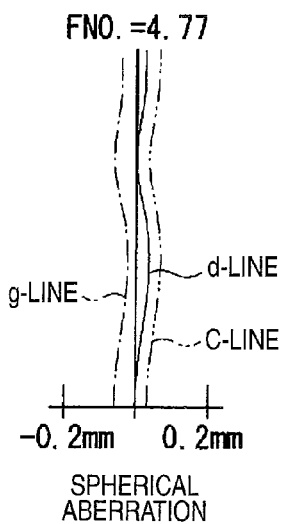
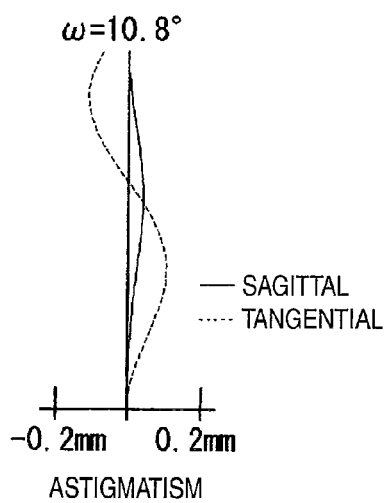
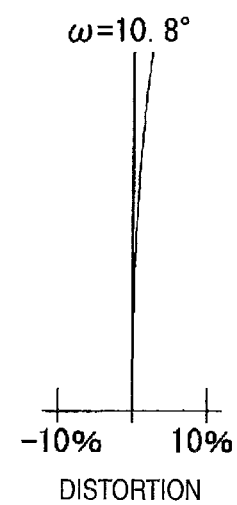

FIG. 19A  FIG. 19B  FIG. 19C
EXAMPLE 2 : WIDE ANGLE END
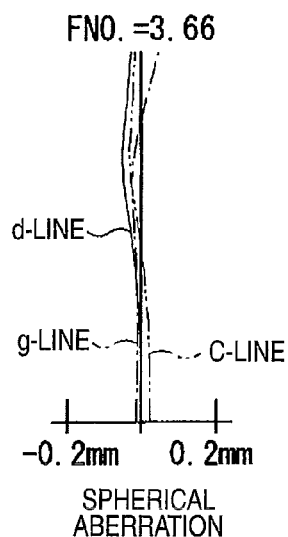
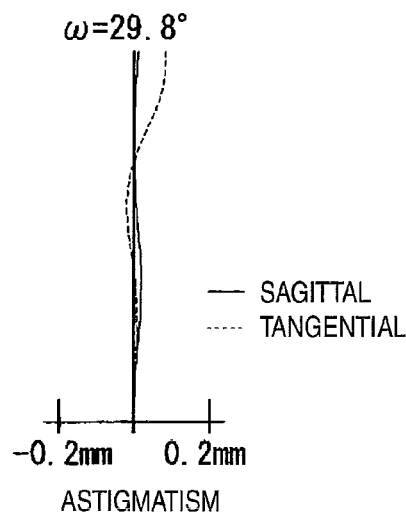
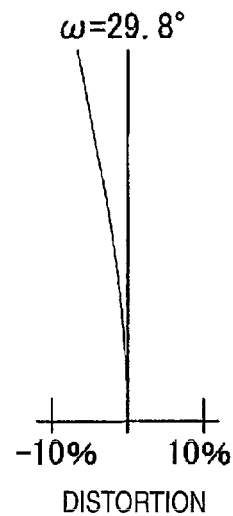
FIG. 20A  FIG. 20B  FIG. 20C
EXAMPLE 2 : TELEPHOTO END
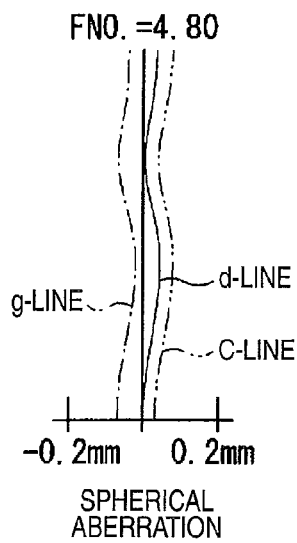
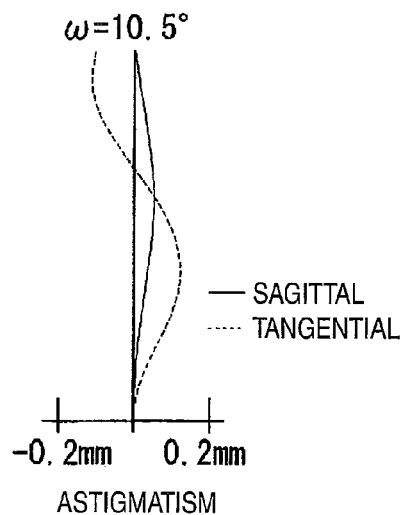
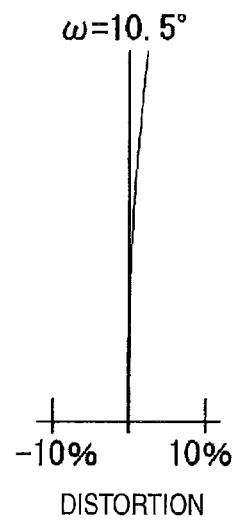

FIG. 21A  FIG. 21B  FIG. 21C
EXAMPLE 3 : WIDE ANGLE END
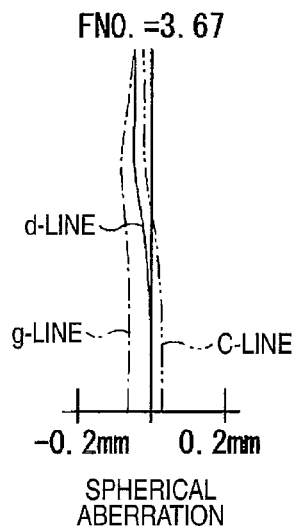
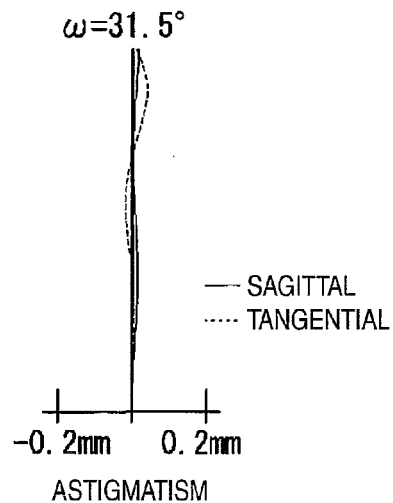
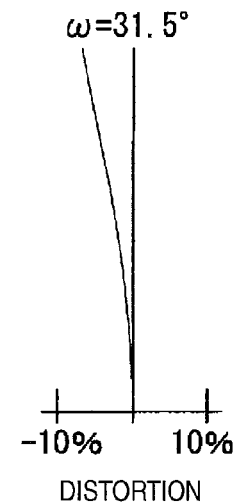
FIG. 22A  FIG. 22B  FIG. 22C
EXAMPLE 3 : TELEPHOTO END
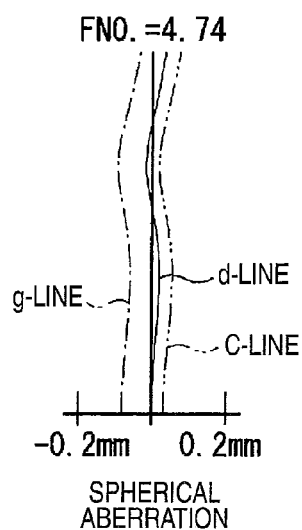
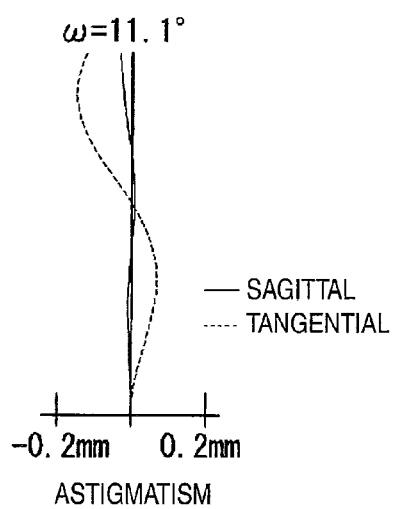
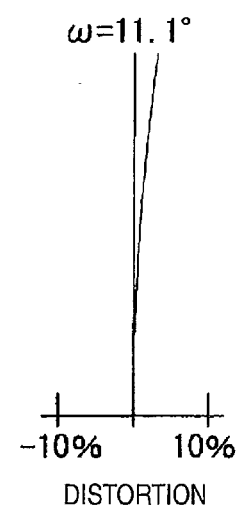

FIG. 23A  FIG. 23B  FIG. 23C
EXAMPLE 4 : WIDE ANGLE END
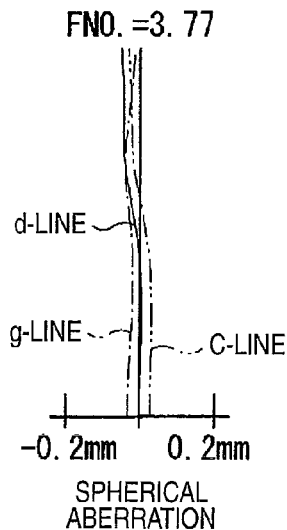
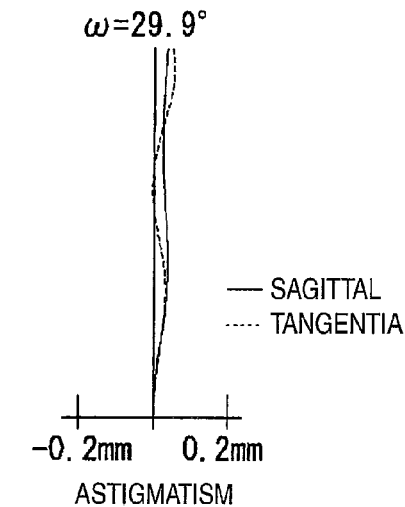
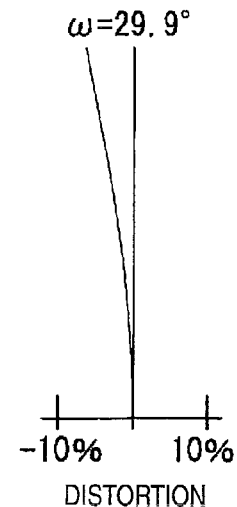
FIG. 24A  FIG. 24B  FIG. 24C
EXAMPLE 4 : TELEPHOTO END
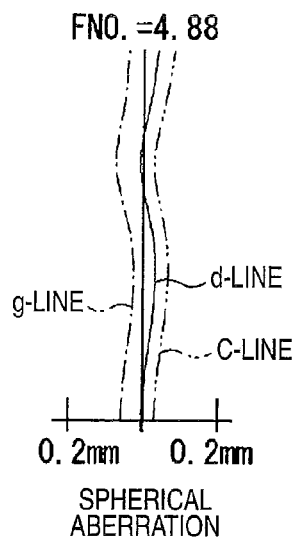
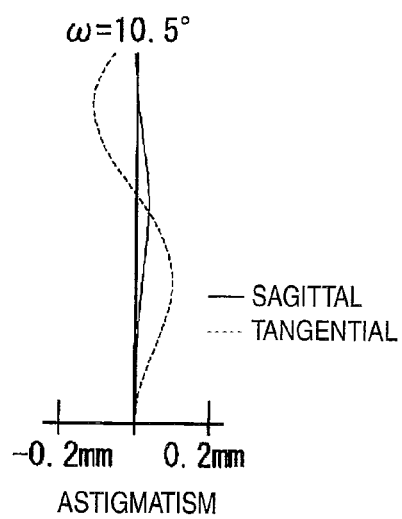
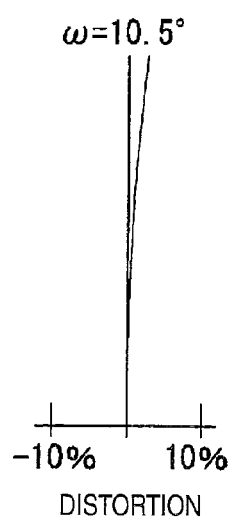

FIG. 25A  FIG. 25B  FIG. 25C
EXAMPLE 6 : WIDE ANGLE END
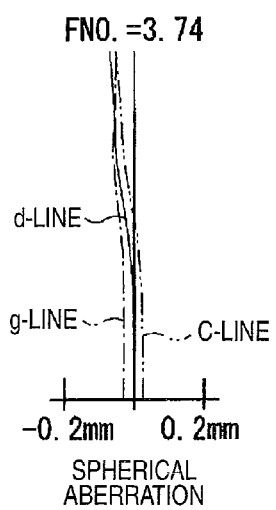
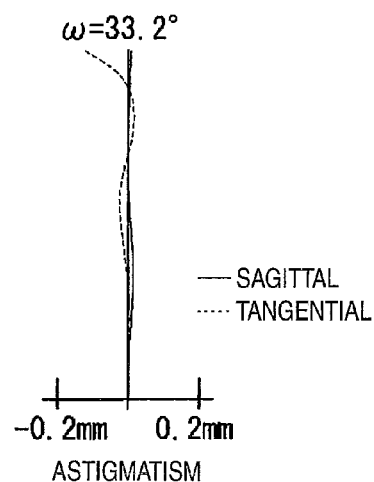
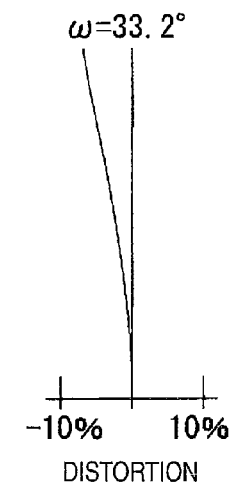
FIG. 26A  FIG. 26B  FIG. 26C
EXAMPLE 5 : TELEPHOTO END
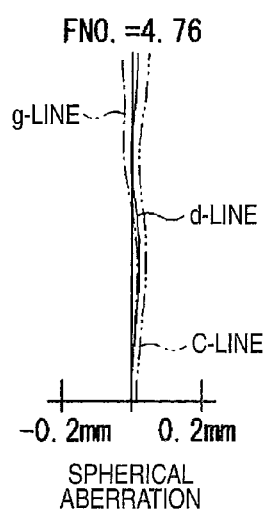
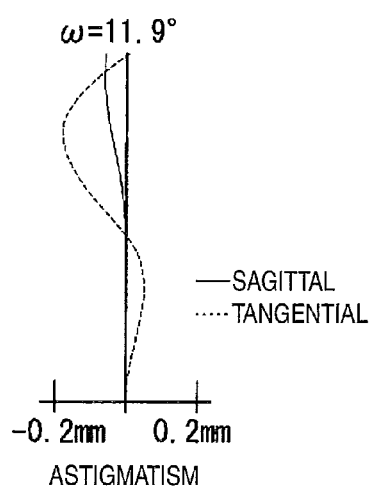
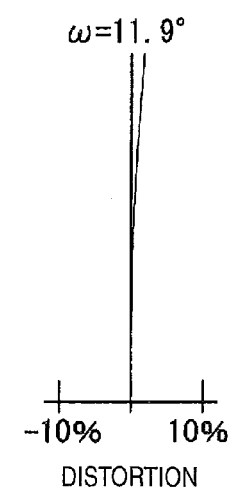

ZOOM LENS AND IMAGING APPARATUS

This application is based on and claims priority under 35 U.S.C §119 from Japanese Patent Application No. 2008-113936, filed on Apr. 24, 2008, the entire disclosure of which is herein incorporated by reference.

BACKGROUND OF THE INVENTION

1. Field of the Invention

The present invention relates to a zoom lens and an imaging apparatus suitably used for small-size apparatuses having an imaging function, particularly, digital still cameras, camera phones, personal digital assistances (PDAs), and the like.

2. Description of Related Art

In recent years, imaging apparatuses such as digital still cameras have been required to be smaller in overall size as imaging devices such as charge coupled devices (CCDs) and complementary metal oxide semiconductors (CMOS's) have become smaller. Therefore, recently, a zoom lens has been developed in which the size in the direction of the thickness when the lens is incorporated in an imaging apparatus is reduced by bending the optical path of the lens system in the middle to form a so-called bending-type optical system.

As a zoom lens using the bending-type optical system, JP-A-2003-202500 discloses examples of a four-group zooming system including in order from the object side: a first lens group having a positive refractive power and including a reflecting member that bends the optical path; a second lens group having a negative refractive power; a third lens group having a positive refractive power; and a fourth lens group having a positive refractive power. In this system, the power-varying is performed by moving the negative second lens group and the positive fourth lens group. In particular, in the example shown in FIG. 1 of JP-A-2003-202500, two lenses are disposed behind the reflecting member in the first lens group, three lenses are used in the second lens group, and a cemented lens is used in the third lens group.

Since the thickness in the direction of the depth when the lens is incorporated in an imaging apparatus can be reduced by using the bending-type optical system as described above, in recent years, this type of zoom lens has started to be mounted in various imaging apparatuses. On the other hand, there is a demand for cost reduction on the market as well as a demand for size reduction. For this reason, it has been desired that a bending-type optical system being advantageous in cost while being reduced in thickness be developed. For cost reduction, it is considered to use a resin material as the lens material; however, when a resin lens is used whose characteristic change due to the temperature is large compared with that of a glass lens, it is desirable to adopt a structure where sufficient consideration is given to the temperature characteristic. Moreover, in order to reduce the overall size of the lens structure and the cost, it is preferable that the number of lenses is small. The four-group zoom lens described in JP-A-2003-202500 has room for improvement with respect to size reduction and cost reduction.

SUMMARY OF THE INVENTION

An object of an illustrative, non-limiting embodiment of the invention is to provide a zoom lens and an imaging apparatus in which cost reduction can be achieved while the size is small and excellent optical performance is maintained.

According to an aspect of the invention, there is provided a zoom lens including: in order from an object side of the zoom lens, a first lens group adapted to be fixed during power-varying of the zoom lens; a second lens group adapted to move during the power-varying; a third lens group adapted to be fixed during the power-varying; and a fourth lens group adapted to move during the power-varying and during focusing of the zoom lens. The first lens group has a positive power as a whole and includes: in order from the object side, a negative lens; a reflecting member that bends the optical path; and a biconvex lens of a positive lens made of a resin material and having an aspherical surface. The second lens group has a negative power as a whole, and includes two lenses. The third lens group includes one positive lens. The fourth lens group has a positive power as a whole, and includes: in order from the object side, a cemented lens having a positive power; and a negative lens made of a resin material and having at least one aspherical surface and a concave surface on the image side thereof.

Since the zoom lens has a structure of the bending-type optical system in which the optical path is bent by the reflecting member disposed in the first lens group, the length in the direction of the thickness of the optical system is suppressed while excellent optical performance is maintained, and the thickness when the zoom lens is incorporated in an imaging apparatus is easily reduced. Moreover, since the number of lenses is made comparatively small by disposing only one lens behind the reflecting member in the first lens group and disposing only two lenses in the second lens group, the zoom lens is advantageous in size reduction and cost reduction. Moreover, while a structure advantageous in aberration correction is formed by using an aspherical surface in each of the first lens group and the fourth lens group, cost reduction is achieved by forming the aspheric lenses of a resin material. Moreover, since the aspheric resin lens of the first lens group is a positive lens and the aspheric resin lens of the fourth lens group is a negative lens, these resin lenses act to make temperature compensation with respect to each other, so that the characteristic variation due to a temperature change is excellently suppressed while cost reduction is achieved by using resin lenses.

Further, by adopting and satisfying the following structures as appropriate, the zoom lens may have more excellent optical performance and may be more advantageous in cost reduction.

The zoom lens may satisfy the following conditional expressions:

$$-1.0 < f2/fw < -3.0 \quad (1)$$

$$2.0 < f4/fw < 5.0 \quad (2)$$

wherein fw is the paraxial focal length of the entire system (the zoom lens) at the wide-angle end, f2 is the paraxial focal length of the second lens group, and f4 is the paraxial focal length of the fourth lens group. Thereby, appropriate conditions are satisfied with respect to the focal lengths of the second lens group and the fourth lens group which are movable groups, so that the zoom lens is advantageous in reducing the size of the lens system in consideration of the zoom movement.

Moreover, the second lens group may include: in order from the object side, a biconcave lens of a negative lens; and a meniscus lens of a positive lens having a convex surface on the object side thereof, and the zoom lens may satisfy the following conditional expression:

$$|RP|/|RN| < 1.1 \quad (3)$$

wherein RN is the paraxial radius of curvature of the image side surface of the negative lens in the second lens group, and RP is the paraxial radius of curvature of the object side surface of the positive lens in the second lens group.

Moreover, the one positive lens in the third lens group may be a positive meniscus lens having at least one aspherical surface and made of a resin material.

Moreover, the zoom lens may satisfy the following conditional expression:

$$-10.0 < P4/fw < 0 \tag{4}$$

wherein P4 is the paraxial focal length of a negative lens which is located closest to an image side in the fourth lens group. Thereby, the negative lens acts to make temperature compensation with respect to another resin lens having positive power, so that the characteristic variation due to a temperature change is excellently suppressed while cost reduction is achieved by using resin lenses.

An imaging apparatus according to an aspect of the present invention includes: the zoom lens; and an imaging device that outputs an imaging signal corresponding to an optical image formed by the zoom lens.

In the imaging apparatus, by using the small-size, low-cost, and high-performance zoom lens of the present invention as the imaging lens, the reduction in the overall size of the apparatus and the reduction in cost are achieved.

BRIEF DESCRIPTION OF THE DRAWINGS

The features of the invention will appear more fully upon consideration of the exemplary embodiment of the invention, which are schematically set forth in the drawings, in which:

FIGS. 1A and 1B show a first structural example of a zoom lens according to an exemplary embodiment of the present invention, and are lens sectional views corresponding to Example 1;

FIGS. 2A and 2B show a second structural example of the zoom lens according to an exemplary embodiment of the present invention, and are lens sectional views corresponding to Example 2;

FIGS. 3A and 3B show a third structural example of the zoom lens according to an exemplary embodiment of the present invention, and are lens sectional views corresponding to Example 3;

FIGS. 4A and 4B show a fourth structural example of the zoom lens according to an exemplary embodiment of the present invention, and are lens sectional views corresponding to Example 4;

FIGS. 6A and 6B are views showing lens data of the zoom lens according to Example 1, FIG. 6A showing basic lens data and FIG. 6B showing data of the surface spacings in the part that moves when the power-varying is performed;

FIG. 7 is a view showing data related to the aspherical surfaces of the zoom lens according to Example 1;

FIGS. 8A and 8B are views showing lens data of the zoom lens according to Example 2, FIG. 8A showing basic lens data and FIG. 8B showing data of the surface spacings in the part that moves when the power-varying is performed;

FIG. 9 is a view showing data related to the aspherical surfaces of the zoom lens according to Example 2;

FIGS. 10A and 10B are views showing lens data of the zoom lens according to Example 3, FIG. 10A showing basic lens data and FIG. 10B showing data of the surface spacings in the part that moves when the power-varying is performed;

FIG. 11 is a view showing data related to the aspherical surfaces of the zoom lens according to Example 3;

FIGS. 12A and 12B are views showing lens data of the zoom lens according to Example 4, FIG. 12A showing basic lens data and FIG. 12B showing data of the surface spacings in the part that moves when the power-varying is performed;

FIG. 13 is a view showing data related to the aspherical surfaces of the zoom lens according to Example 4;

FIGS. 14A and 14B are views showing lens data of the zoom lens according to example 5, FIG. 14A showing basic lens data and FIG. 14B showing data of the surface spacings in the part that moves when the power-varying is performed;

FIG. 15 is a view showing data related to the aspherical surfaces of the zoom lens according to Example 5;

FIG. 16 is a view showing a summary of values, related to conditional expressions, of each example in a table;

FIGS. 17A to 17C are graphic representations of aberrations at the wide-angle end in the zoom lens according to Example 1, FIG. 17A showing spherical aberration, FIG. 17B showing astigmatism, and FIG. 17C showing distortion;

FIGS. 18A to 18C are graphic representations of aberrations at the telephoto end in the zoom lens according to Example 1, FIG. 18A showing spherical aberration, FIG. 18B showing astigmatism, and FIG. 18C showing distortion;

FIGS. 19A to 19C are graphic representations of aberrations at the wide-angle end in the zoom lens according to Example 2, FIG. 19A showing spherical aberration, FIG. 19B showing astigmatism, and FIG. 19C showing distortion;

FIGS. 20A to 20C are graphic representations of aberrations at the telephoto end in the zoom lens according to Example 2, FIG. 20A showing spherical aberration, FIG. 20B showing astigmatism, and FIG. 20C showing distortion;

FIGS. 21A to 21C are graphic representations of aberrations at the wide-angle end in the zoom lens according to Example 3, FIG. 21A showing spherical aberration, FIG. 21B showing astigmatism, and FIG. 21C showing distortion;

FIGS. 22A to 22C are graphic representations of aberrations at the telephoto end in the zoom lens according to Example 3, FIG. 22A showing spherical aberration, FIG. 22B showing astigmatism, and FIG. 22C showing distortion;

FIGS. 23A to 23C are graphic representations of aberrations at the wide-angle end in the zoom lens according to Example 4, FIG. 23A showing spherical aberration, FIG. 23B showing astigmatism, and FIG. 23C showing distortion;

FIGS. 24A to 24C are graphic representations of aberrations at the telephoto end in the zoom lens according to Example 4, FIG. 24A showing spherical aberration, FIG. 24B showing astigmatism, and FIG. 24C showing distortion;

FIGS. 25A to 25C are graphic representations of aberrations at the wide-angle end in the zoom lens according to Example 5, FIG. 25A showing spherical aberration, FIG. 25B showing astigmatism, and FIG. 25C showing distortion;

FIGS. 26A to 26C are graphic representations of aberrations at the telephoto end in the zoom lens according to Example 5, FIG. 26A showing spherical aberration, FIG. 26B showing astigmatism, and FIG. 26C showing distortion;

DETAILED DESCRIPTION OF THE EXEMPLARY EMBODIMENTS

Figure 5A:
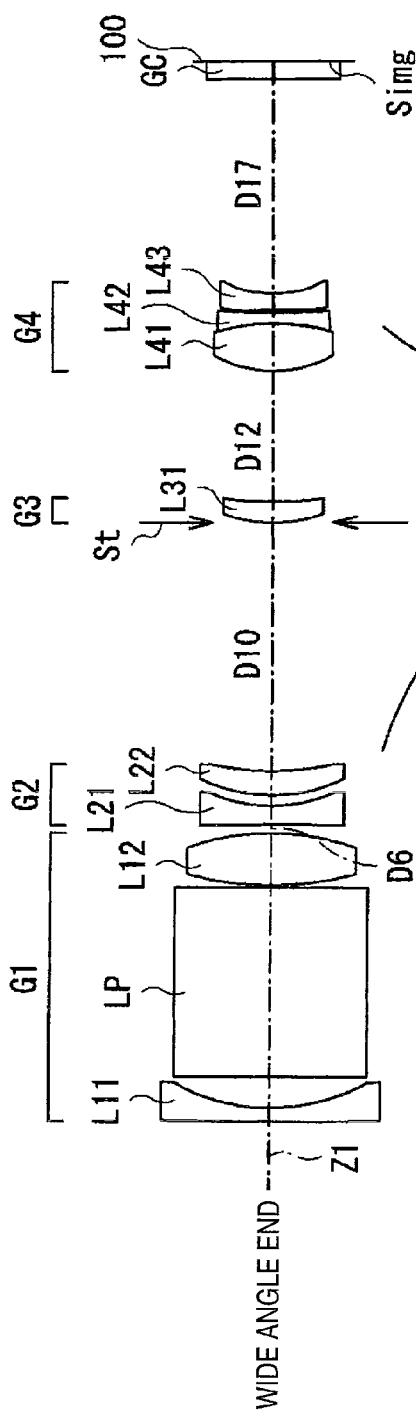
FIGS. 5A and 5B show a fifth structural example of the zoom lens according to an exemplary embodiment of the present invention, and are lens sectional views corresponding to Example 5.

In an zoom lens according to an exemplary embodiment of the present invention, since the structure of the bending-type optical system advantageous in size reduction is adopted and the number of lenses is made comparatively small so that the structure of each lens group is optimized, cost reduction can be achieved while the size is small and excellent optical performance is maintained.

Moreover, in an imaging apparatus according to an exemplary embodiment of the present invention, since the small-size, low-cost, and high-performance zoom lens according to an exemplary embodiment of the present invention is used as the imaging lens, the reduction in the overall size of the apparatus and the reduction in cost are achieved while excellent optical performance is maintained.

Hereinafter, an exemplary embodiment of the present invention will be described in detail with reference to the drawings.

FIGS. 1A and 1B show a first structural example of a zoom lens according to an exemplary embodiment of the present invention. This structural example corresponds to the lens structure of a later-described first numerical example (FIGS. 6A, 6B, and 7). FIG. 1A corresponds to an optical system arrangement at the wide-angle end (shortest focal length condition), and FIG. 1B corresponds to an optical system arrangement at the telephoto end (longest focal length condition). Likewise, the sectional structures of a second to fifth structural examples corresponding to the lens structures of a later-described second to fifth numerical examples are shown in FIGS. 2A and 2B through 5A and 5B. In FIGS. 1A and 1B through 5A and 5B, reference designation Ri represents the radius of curvature of the i-th surface assigned a reference designation so that with the surface of the most object side element as the first one, the number increases one by one toward the image side (image formation side). Reference designation Di represents the surface spacing, on the optical axis Z1, between the i-th surface and the (i+1)-th surface. With respect to the reference designation Di, the reference designation is shown only for the surface spacings D6, D10, D12, and D17 in the part that changes when the power-varying is performed. Since the basic structures of these structural examples are the same, description will be given based on the first structural example shown in FIGS. 1A and 1B.

This zoom lens includes, in order from the object side along the optical axis Z1, a first lens group G1, a second lens group G2, a third lens group G3, and a fourth lens group G4. An optical aperture diaphragm St is disposed, for example, on the object side of the third lens group G3.

This zoom lens is mountable in small-size apparatuses having an imaging function, for example, imaging apparatuses such as digital cameras, video cameras, camera phones, and PDAs. On the image side of this zoom lens, a member suitable for the structure of the imaging section of the camera where the zoom lens is mounted is disposed. For example, on the image formation surface (imaging surface) Simg of this zoom lens, an imaging device 100 such as a CCD or a CMOS is disposed. The imaging device 100 outputs an imaging signal corresponding to the optical image formed by this zoom lens. At least this zoom lens and the imaging device 100 constitute an imaging apparatus according to the present embodiment. Between the last lens group (fourth lens group G4) and the imaging device 100, various optical members GC may be disposed according to the structure of the camera where the lens is mounted. For example, a flat optical member such as a cover glass or an infrared cut filter for protecting the imaging surface may be disposed.

In this zoom lens, the power-varying is performed by varying spacings between lens groups. More specifically, the first lens group G1 and the third lens group G3 are always fixed when the power-varying is performed, and the second lens group G2 and the fourth lens group G4 move along the optical axis Z1 when the power-varying is performed. In this zoom lens, as the power-varying is performed from the wide-angle end to the telephoto end, the movable groups move from the condition of FIG. 1A to the condition of FIG. 1B along the paths shown by the solid lines in the figure. In this case, the second lens group G2 mainly acts to perform the power-varying, and the fourth lens group G4 acts to correct the image plane variation due to the power-varying. The fourth lens group G4 also moves during focusing of the zoom lens.

This zoom lens has resin lenses at least in the first lens group G1 and the fourth lens group G4. Moreover, it is preferable that this zoom lens has a resin lens also in the third lens group G3. An aspheric lens may be used in each lens group as required. When an aspheric lens is used, it is preferable that the aspheric lens be a resin lens since the resin material is excellent in moldability and cost reduction is achieved.

It is preferable that this zoom lens is configured so as to satisfy the following conditional expressions:

$$-1.0 < f2/fw < -3.0 \qquad (1)$$

$$2.0 < f4/fw < 5.0 \qquad (2)$$

wherein fw is a paraxial focal length of the entire system at the wide-angle end, f2 is the paraxial focal length of the second lens group G2, and f4 is the paraxial focal length of the fourth lens group G4.

The first lens group G1 has a positive power as a whole. The first lens group G1 includes: in order from the object side, a negative lens, a reflecting member that bends the optical path substantially 90 degrees; and a positive lens. More specifically, for example, as shown in FIGS. 1A and 1B, the first lens group G1 includes: in order from the object side, a negative meniscus lens L11 having a convex surface on the object side; a right-angle prism LP as the reflecting member; and a biconvex positive lens L12 having at least one aspherical surface and made of a resin material.

Figure 27:
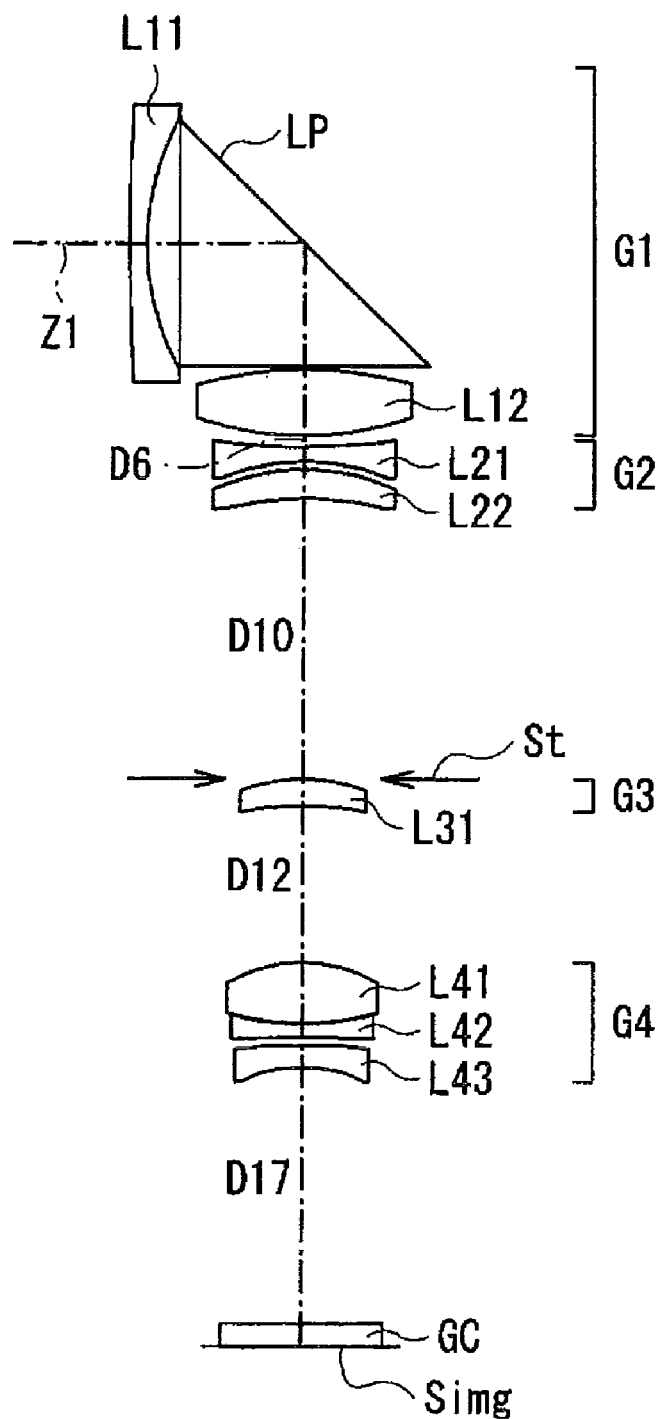
FIG. 27 is an explanatory view of a bending-type optical system.

The zoom lens according to the present embodiment is a bending-type optical system, and in actuality, as shown in FIG. 27, in the first lens group G1, the optical path is bent substantially 90 degrees, for example, at the internal reflecting surface of the right-angle prism LP. In FIGS. 1A and 1B through 5A and 5B, the optical axis Z1 is shown as linear, the internal reflecting surface of the reflecting member LP is not shown, and the zoom lens is developed in the same direction so that it is shown as an equivalently linear optical system. A different reflecting member such as a reflecting mirror may be used instead of the right-angle prism LP.

The second lens group G2 has a negative power as a whole. The second lens group G2 includes two lenses. More specifically, for example, as shown in FIGS. 1A and 1B, the second lens group G2 includes: in order from the object side, a biconcave negative lens L21 and a meniscus positive lens L22 having a convex surface on the object side. It is preferable that the second lens group G2 satisfies the following conditional expression:

$$|RP|/|RN| < 1.1 \qquad (3)$$

wherein RN is the paraxial radius of curvature of the image side surface of the negative lens L21 and RP is the paraxial radius of curvature of the object side surface of the positive lens L22.

The third lens group G3 includes one lens. More specifically, for example, as shown in FIGS. 1A and 1B, it is preferable that the third lens group G3 includes one positive meniscus lens L31 having at least one aspherical surface and made of a resin material. In particular, when the aperture diaphragm St is disposed near the third lens group G3, it is preferable that the lens surface near the aperture diaphragm St is an aspherical surface. This is advantageous in spherical aberration correction.

The fourth lens group G4 has a positive power as a whole. The fourth lens group G4 includes: in order from the object side, a cemented lens having a positive power, and a negative lens L43 having at least one surface aspherical surface and a concave surface on the image side and made of a resin material. The cemented lens includes: in order from the object side, for example, a positive lens L41 and a negative lens L42. It is preferable that the most image side negative lens L43 has a comparatively strong negative power for the temperature compensation with respect to another resin lens having positive power; for example, it is preferable that the negative lens L43 is a biconcave lens or a negative meniscus lens concave to the image side. Moreover, it is preferable that the negative lens L43 satisfies the following conditional expression:

$$-10.0 < P4/fw < 0 \tag{4}$$

where P4 is the paraxial focal length of the negative lens L43.

Figure 28A:
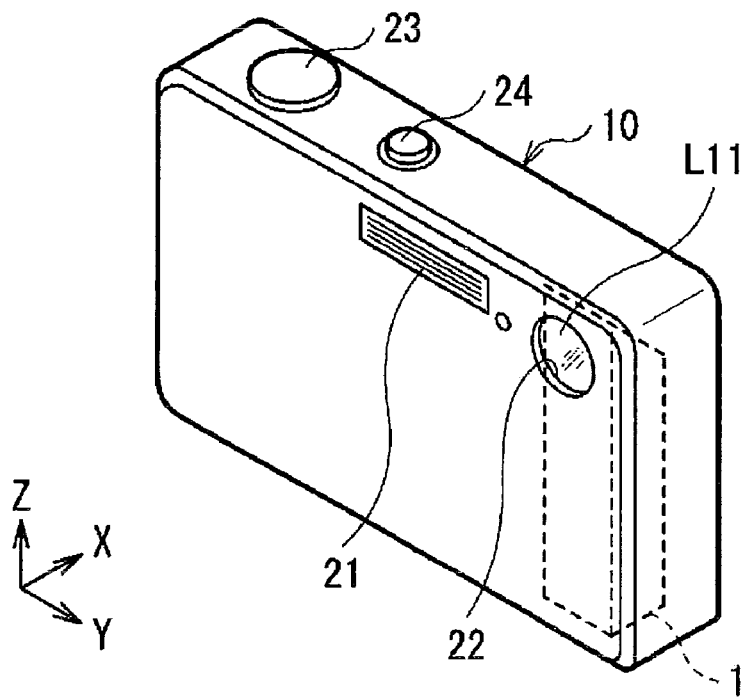
FIGS. 28A and 28B are an external view showing a digital camera as an imaging apparatus according to an exemplary embodiment of the present invention.
Figure 28B:
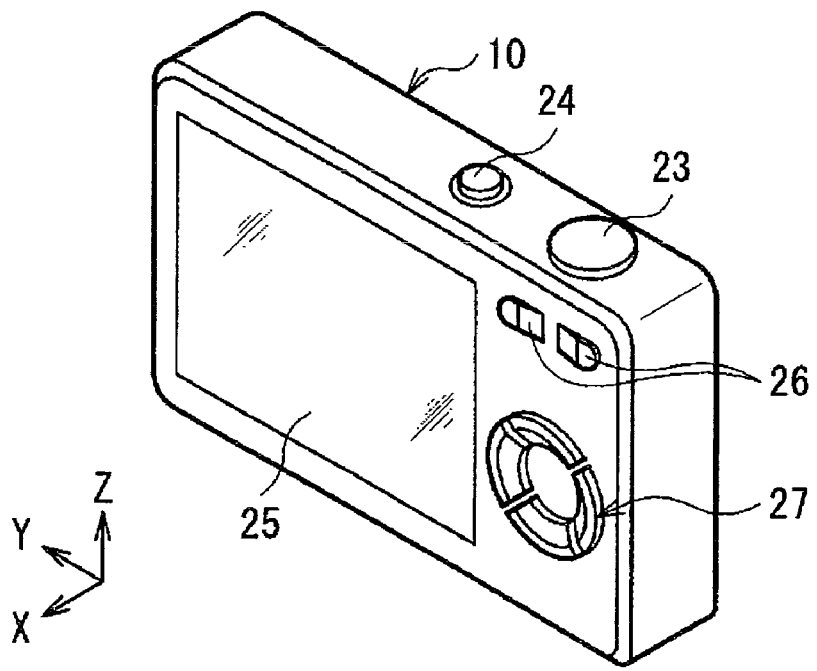

FIGS. 28A and 28B show a digital still camera as an example of the imaging apparatus provided with this zoom lens. FIG. 28A shows the exterior of the digital still camera 10 when viewed from the front side. FIG. 28B shows the exterior of the digital still camera 10 when viewed from the back side. The digital still camera 10 has, in the upper central part of the front side thereof, a flashlight emitter 21 that emits flashlight. At a side of the flash light emitter 21 on the front side, a photographic opening 22 through which light from the object to be photographed is incident is provided. The digital still camera 10 also has a release button 23 and a power button 24 on the top side thereof. The digital still camera 10 also has a display 25 and operation portions 26 and 27 on the back side. The display 25 is for displaying the taken images. In the digital still camera 10, one frame of still image is taken by pressing the release button 23, and the image data obtained by the image taking is recorded on a memory card (not shown) attached to the digital still camera 10.

The digital still camera 10 has an imaging lens 1 in the housing. As the imaging lens 1, the zoom lens according to the present embodiment is used. The taking lens 1 is disposed so that the most object side lens (negative meniscus lens L11) is situated in the photographic opening 22 provided on the front side. The imaging lens 1 is incorporated in the longitudinal direction as a whole in the digital still camera 10 so that the optical axis Z1 after the bending by the right-angle prism LP coincides with the longitudinal direction of the camera body. It may be incorporated in the lateral direction as a whole in the digital still camera 10 so that the optical axis Z1 after the bending is in the lateral direction of the camera body.

Next, the operation and effect of the zoom lens structured as described above will be described.

Since this zoom lens has the structure of the bending-type optical system in which the optical path is bent by the reflecting member disposed in the first lens group G1, the length in the direction of the thickness of the optical system is suppressed while excellent optical performance is maintained, and the thickness when the zoom lens is incorporated in an imaging apparatus is easily reduced. Moreover, since the number of lenses is made comparatively small by disposing only one positive lens L12 behind the reflecting member in the first lens group G1 and disposing only two lenses in the second lens group, this zoom lens is advantageous in size reduction and cost reduction. Moreover, since the appropriate conditional expressions (1) and (2) are satisfied with respect to the focal lengths of the second lens group G2 and the fourth lens group G4 which are moving units, the size of the lens system can be reduced in consideration of the zoom movement. Moreover, while a structure advantageous in aberration correction is formed by using an aspherical surface at least in each of the first lens group G1 and the fourth lens group G4, cost reduction is achieved by forming the aspheric lenses of a resin material. Moreover, since the resin lens of the fourth lens group G4 is the negative lens L43, the negative lens L43 acts to make temperature compensation between another positive resin lens (for example, the positive lens L12 of the first lens group G1) and itself, so that the characteristic variation due to a temperature change is excellently suppressed while cost reduction is achieved by using resin lenses. Moreover, since the aspheric lenses are resin lenses, manufacture is easy compared with glass aspheric lenses, so that cost reduction can be achieved while higher performance is achieved.

The conditional expression (1) relates to the power of the second lens group G2. Exceeding the upper limit is unfavorable since the power is too strong and this increases the error sensitivity to the design value. Falling below the lower limit is unfavorable since the movement amount of the second lens group G2 is too large and this increases the size of the lens system.

The conditional expression (2) relates to the power of the fourth lens group G4. Falling below the lower limit is unfavorable since the power is too strong and this increases the error sensitivity to the design value. Exceeding the upper limit is unfavorable since the movement amount of the fourth lens group G4 is too large and this increases the size of the lens system.

The conditional expression (3) relates to the surface configuration of the lenses in the second lens group G2. When the condition of the conditional expression (3) is unsatisfied, the correction of aberration such as field curvature is difficult.

The conditional expression (4) relates to the power of the resin lens (negative lens L43) in the fourth lens group G4. When the condition of the conditional expression (4) is unsatisfied, the temperature compensation with respect to another positive resin lens by the negative lens L43 is difficult.

As described above, in a zoom lens according to the present embodiment, since the structure of the bending-type optical system advantageous in size reduction is adopted and the number of lenses is made comparatively small so that the structure of each lens group is optimized, cost reduction can be achieved while the size is small and excellent optical performance is maintained. Moreover, in a imaging apparatus provided with the zoom lens according to the present embodiment, the reduction in the overall size of the apparatus and the reduction in cost can be achieved while excellent imaging performance is maintained.

EXAMPLES

Next, concrete numerical examples of a zoom lens according to the present embodiment will be described. Hereinafter, a plurality of numerical examples will be collectively described.

FIGS. 6A, 6B, and 7 show concrete lens data corresponding to the structure of the zoom lens shown in FIGS. 1A and 1B. In particular, FIG. 6A shows the basic lens data, and FIGS. 6B and 7 show other data. In the column of the surface number Si in the lens data shown in FIG. 6A, with respect to the zoom lens according to Example 1, the numbers of the i-th surfaces (i=1 to 22) are shown. The i-th surfaces are each assigned a reference designation so that with the surface of the most object side element as the first one, the number increases one by one toward the image side. In the column of the radius of curvature Ri, the values (mm) of the radii of curvature of the i-th surfaces counted from the object side are shown in association with the reference designation Ri assigned in FIG. 1B. Likewise, in the column of the surface spacing Di, the on-axis spacings (mm) between the i-th surfaces Si and the (i+1)-th surfaces Si+1 counted from the object side are shown. In the column of Ndj, the values of the refractive indices, at the d-line (587.6 nm), of the j-th optical elements counted from the object side are shown. In the column of vdj, the values of the Abbe numbers, at the d-line, of the j-th optical elements counted from the object side are shown. In FIG. 6A, the paraxial focal lengths f (mm) of the entire system at the wide-angle end and the telephoto end, the angle of view (2ω), and the F-number (FNO.) are also shown as pieces of data.

In the zoom lens according to Example 1, the most image side positive lens L12 in the first lens group G1, the positive meniscus lens L31 in the third lens group G3, and the most image side negative lens L43 in the fourth lens group G4 are resin lenses.

In the zoom lens according to Example 1, since the second lens group G2 and the fourth lens group G4 move on the optical axis when the power-varying performed, the values of the surface spacings D6, D10, D12, and D17 before and behind these lens groups are variable. FIG. 6B shows the values of the surface spacings D6, D10, D12, and D17 at the wide-angle end and the telephoto end as the data at the time of the power-varying.

In the lens data of FIG. 6A, the symbol "*" affixed to the left side of the surface numbers indicates that the lens surfaces are aspheric. In the zoom lens according to Example 1, both side surfaces S5 and S6 of the positive lens L12 in the first lens group G1, both side surfaces S11 and S12 of the positive meniscus lens L31 in the third lens group G3, and both side surfaces S16 and S17 of the negative lens L43 in the fourth lens group G4 are all aspheric. In the basic lens data of FIG. 6A, the numerical values of the radii of curvature near the optical axis are shown as the radii of curvature of these aspherical surfaces.

FIG. 7 shows the aspherical surface data of the zoom lens according to Example 1. In the numerical values shown as the aspherical surface data, the symbol "E" indicates that the succeeding numerical value is the "exponent" to the base 10, and indicates that the numerical value preceding "E" is multiplied by the numerical value represented by the exponential function to the base 10. For example, "1.0E-02" represents "$1.0 \times 10^{-2}$".

As the aspherical surface data of the zoom lens according to Example 1, the values of the coefficients An and KA in the expression of the aspherical surface configuration expressed by the expression (A) shown below are shown. Z represents, more specifically, the length (mm) of the normal from a point on an aspherical surface situated at a height h from the optical axis, down to the tangential plane (plane vertical to the optical axis) to the vertex of the aspherical surface.

$$Z = Ch^2 / \{1 + (1 - KAC^2 h^2)^{1/2}\} + \Sigma A_n h^n \quad (A)$$

(n=an integer that is 3 or higher)

Here, Z is the depth (mm) of the aspherical surface, h is the distance (height) (mm) from the optical axis to the lens surface, KA is the eccentricity, C is the paraxial curvature=1/R (R is the paraxial radius of curvature), and $A_n$ is the n-th aspheric coefficient.

The zoom lens according to Example 1 is expressed by effectively using the degrees from $A_3$ to $A_{12}$ as the aspheric coefficients $A_n$.

Figure 5B:
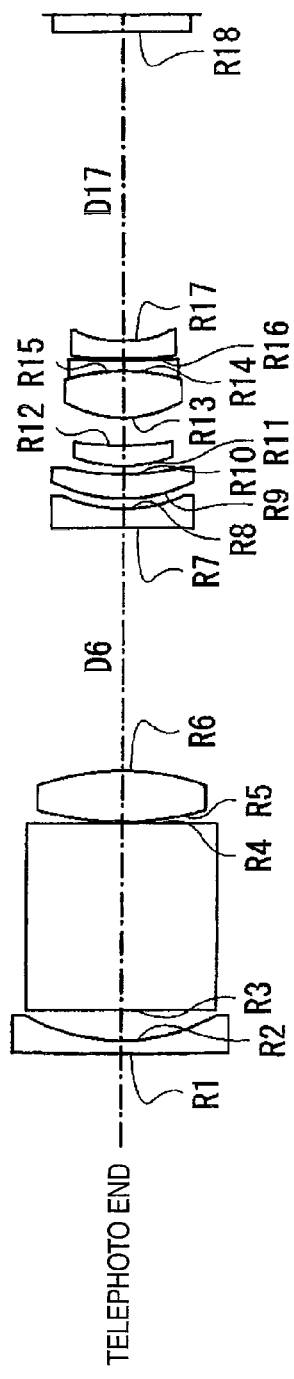

Similarly to the zoom lens according to Example 1 described above, the concrete lens data corresponding to the structure of the zoom lens shown in FIGS. 2A and 2B is shown in FIGS. 8A, 8B, and 9 as Example 2. Likewise, the concrete lens data corresponding to the structure of the zoom lens shown in FIGS. 3A and 3B is shown in FIGS. 10A, 10B, and 11 as Example 3. Likewise, the concrete lens data corresponding to the structure of the zoom lens shown in FIGS. 4A and 4B is shown in FIGS. 12A, 12B, and 13 as Example 4. Likewise, the concrete lens data corresponding to the structure of the zoom lens shown in FIGS. 5A and 5B is shown in FIGS. 14A, 14B, and 15 as Example 5.

In all of the zoom lenses of Examples 2 to 5, similar surfaces to those of the zoom lens according to Example 1 are aspheric. Moreover, in all of the zoom lenses of Examples 2 to 5, similar lenses to those of the zoom lens according to Example 1 are resin lenses.

FIG. 16 shows a summary of the values, related to the above-described conditional expressions, of each example. As is apparent from FIG. 16, the values of each example are within the numerical value ranges of the conditional expressions.

FIGS. 17A to 17C show the spherical aberration, the astigmatism, and the distortion at the wide-angle end in the zoom lens according to Example 1, respectively. FIGS. 18A to 18B show similar aberrations at the telephoto end. These graphic representations of aberrations show aberrations at the d-line (587.6 nm) as the reference wavelength. The graphic representations of spherical aberration also show aberrations at the g-line (wavelength 435.8 nm) and the C-line (wavelength 656.3 nm). In the graphic representations of astigmatism, the solid line shows the aberration in the sagittal direction, and the broken line shows the aberration in the tangential direction. FNO. shows the F-number, and ω shows the half angle of view.

Likewise, the aberrations of the zoom lens according to Example 2 are shown in FIGS. 19A to 19C (wide-angle end) and FIGS. 20A to 20C (telephoto end). Likewise, the aberrations of the zoom lenses according to Examples 3 to 5 are shown in FIGS. 21A to 21C through 26A to 26C.

As is apparent from the numerical value data and the graphic representations of aberrations, in each example, by efficiently using the aspherical surfaces and the resin lenses, a zoom lens is realized in which the aberrations are excellently corrected and cost reduction is achieved while the size is small and excellent optical performance is maintained.

The present invention is not limited to the above-described embodiment and examples, and various modifications are possible. For example, the values of the radii of curvature, the surface spacings, and refractive indices of the lens elements are not limited to the values shown in the numerical examples, but may take different values.

What is claimed is:

1. A zoom lens comprising: in order from an object side of the zoom lens,
    a first lens group adapted to be fixed during power-varying of the zoom lens, the first lens group having a positive power and including in order from the object side, a negative lens, a reflecting member that bends an optical path thereof, and a biconvex lens of a positive lens made of a resin material and having at least one aspherical surface;

a second lens group adapted to move during the power-varying, the second lens group having a negative power and including two lenses;

a third lens group adapted to be fixed during the power-varying and including one positive lens; and a fourth lens group adapted to move during the power-varying and during focusing of the zoom lens, the fourth lens having a positive power and including in order from the object side, a cemented lens group having a positive power, and a negative lens made of a resin material and having at least one aspherical surface and a concave surface on an image side of the fourth lens group.

2. The zoom lens according to claim 1, satisfying conditional expression (1):

$$-1.0 < f2/fw < -3.0 \quad (1)$$

wherein fw is a paraxial focal length at a wide-angle end of the zoom lens, and f2 is a paraxial focal length of the second lens group.

3. The zoom lens according to claim 2, satisfying conditional expression (2):

$$2.0 < f4/fw < 5.0 \quad (2)$$

wherein f4 is a paraxial focal length of the fourth lens group.

4. The zoom lens according to claim 2, wherein the second lens group includes in order from the object side, a biconcave lens of a negative lens, and a meniscus lens of a positive lens having a convex surface on the object side thereof, and the zoom lens satisfies conditional expression (3):

$$|RP|/|RN| < 1.1 \quad (3)$$

wherein RN is a paraxial radius of curvature of an image side surface of the negative lens in the second lens group, and RP is a paraxial radius of curvature of an object side surface of the positive lens in the second lens group.

5. The zoom lens according to claim 2, wherein the one positive lens in the third lens group is a meniscus lens having at least one aspherical surface and made of a resin material.

6. The zoom lens according to claim 2, satisfying conditional expression (4):

$$10.0 < P4/fw < 0 \quad (4)$$

wherein P4 is a paraxial focal length of a negative lens which is located closest to an image side in the fourth lens group.

7. An imaging apparatus comprising:
a zoom lens according to claim 2; and
an imaging device that outputs an imaging signal corresponding to an optical image formed by the zoom lens.

8. The zoom lens according to claim 1, satisfying conditional expression (2):

$$2.0 < f4/fw < 5.0 \quad (2)$$

wherein fw is a paraxial focal length at a wide-angle end of the zoom lens, and f4 is a paraxial focal length of the fourth lens group.

9. The zoom lens according to claim 8, wherein the second lens group includes in order from the object side, a biconcave lens of a negative lens, and a meniscus lens of a positive lens having a convex surface on the object side thereof, and the zoom lens satisfies conditional expression (3):

$$|RP|/|RN| < 1.1 \quad (3)$$

wherein RN is a paraxial radius of curvature of an image side surface of the negative lens in the second lens group, and RP is a paraxial radius of curvature of an object side surface of the positive lens in the second lens group.

10. The zoom lens according to claim 8, wherein the one positive lens in the third lens group is a meniscus lens having at least one aspherical surface and made of a resin material.

11. The zoom lens according to claim 8, satisfying conditional expression (4):

$$-10.0 < P4/fw < 0 \quad (4)$$

wherein P4 is a paraxial focal length of a negative lens which is located closest to an image side in the fourth lens group.

12. The zoom lens according to claim 1, wherein the second lens group includes in order from the object side, a biconcave lens of a negative lens, and a meniscus lens of a positive lens having a convex surface on the object side thereof, and the zoom lens satisfies conditional expression (3):

$$|RP|/|RN| < 1.1 \quad (3)$$

wherein RN is a paraxial radius of curvature of an image side surface of the negative lens in the second lens group, and RP is a paraxial radius of curvature of an object side surface of the positive lens in the second lens group.

13. The zoom lens according to claim 12, wherein the one positive lens in the third lens group is a meniscus lens having at least one aspherical surface and made of a resin material.

14. The zoom lens according to claim 12, satisfying conditional expression (4):

$$-10.0 < P4/fw < 0 \quad (4)$$

wherein fw is a paraxial focal length at a wide-angle end of the zoom lens, and P4 is a paraxial focal length of a negative lens which is located closest to an image side in the fourth lens group.

15. The zoom lens according to claim 1, wherein the one positive lens in the third lens group is a meniscus lens having at least one aspherical surface and made of a resin material.

16. The zoom lens according to claim 15, satisfying conditional expression (4):

$$-10.0 < P4/fw < 0 \quad (4)$$

wherein fw is a paraxial focal length at a wide-angle end of the zoom lens, and P4 is a paraxial focal length of a negative lens which is located closest to an image side in the fourth lens group.

17. The zoom lens according to claim 1, satisfying conditional expression (4):

$$10.0 < P4/fw < 0 \quad (4)$$

wherein fw is a paraxial focal length at a wide-angle end of the zoom lens, and P4 is a paraxial focal length of a negative lens which is located closest to an image side in the fourth lens group.

18. An imaging apparatus comprising:
a zoom lens according to claim 1; and
an imaging device that outputs an imaging signal corresponding to an optical image formed by the zoom lens.

* * * * *